(12) United States Patent
Lu et al.

(10) Patent No.: US 11,432,370 B2
(45) Date of Patent: Aug. 30, 2022

(54) D2D COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 3 days.

(21) Appl. No.: 17/144,041

(22) Filed: Jan. 7, 2021

(65) Prior Publication Data
US 2021/0136866 A1 May 6, 2021

Related U.S. Application Data

(63) Continuation of application No. PCT/CN2019/096761, filed on Jul. 19, 2019.

(30) Foreign Application Priority Data

Jul. 19, 2018 (CN) .......................... 201810798883.3

(51) Int. Cl.
*H04W 88/06* (2009.01)
*H04W 4/40* (2018.01)

(52) U.S. Cl.
CPC .............. *H04W 88/06* (2013.01); *H04W 4/40* (2018.02)

(58) Field of Classification Search
CPC . H04W 52/0229; H04W 76/12; H04W 76/15; H04W 74/0833; H04W 80/04; H04W 88/06; H04W 76/14; H04W 4/40; H04W 72/1284; H04W 28/085; H04W 80/02; H04W 80/08
See application file for complete search history.

(56) References Cited

U.S. PATENT DOCUMENTS

| 10,492,241 | B2 * | 11/2019 | Pradas ................. H04W 76/15 |
| 2017/0331577 | A1 | 11/2017 | Parkvall et al. |
| 2017/0331670 | A1 * | 11/2017 | Parkvall ............ H04W 52/0229 |
| 2019/0132897 | A1 * | 5/2019 | Pradas .............. H04W 72/1284 |

(Continued)

FOREIGN PATENT DOCUMENTS

| CN | 101374331 | 2/2009 |
| CN | 103796317 | 5/2014 |

(Continued)

OTHER PUBLICATIONS

D. Koziol, F. S. Moya, L. Yu, V. Van Phan and S. Xu, "QoS and service continuity in 3GPP D2D for IoT and wearables," 2017 IEEE Conference on Standards for Communications and Networking (CSCN), Oct. 2017, pp. 233-239, doi: 10.1109/CSCN.2017.8088627. (Year: 2017).*

(Continued)

*Primary Examiner* — William D Cumming
(74) *Attorney, Agent, or Firm* — Hodgson Russ LLP (57) ABSTRACT

A device-to-device (D2D) communication method includes: performing, by a terminal device using a same packet data convergence protocol (PDCP) entity, D2D communication in a long term evolution (LTE) standard and a new radio (NR) standard.

12 Claims, 3 Drawing Sheets

300

START

310

Terminal device performs D2D communication in LTE and NR standards using same PDCP entity, including: performing, using the same PDCP entity, the D2D communication through a default transmission path when a volume of data to be transmitted is smaller than or equal to a default data volume threshold; and/or, performing, using the same PDCP entity, the D2D communication through different transmission paths when the volume of data to be transmitted is greater than or equal to the default data volume threshold

END

(56) References Cited

U.S. PATENT DOCUMENTS

| | | | |
|---|---|---|---|
| 2019/0230682 A1* | 7/2019 | Tang | H04W 76/15 |
| 2019/0335369 A1* | 10/2019 | Zhang | H04W 74/0833 |
| 2019/0335521 A1* | 10/2019 | Shi | H04W 80/08 |
| 2020/0058409 A1* | 2/2020 | Pradas | H04W 28/085 |
| 2020/0374962 A1* | 11/2020 | Wu | H04W 76/14 |
| 2021/0068176 A1* | 3/2021 | Luo | H04W 76/15 |
| 2021/0136866 A1* | 5/2021 | Lu | H04W 4/40 |
| 2021/0168758 A1* | 6/2021 | Luo | H04W 76/30 |
| 2021/0377846 A1* | 12/2021 | Zhu | H04L 5/0053 |
| 2022/0046754 A1* | 2/2022 | Xu | H04W 80/02 |

FOREIGN PATENT DOCUMENTS

| | | | | |
|---|---|---|---|---|
| WO | 2017039736 | | 3/2017 | |
| WO | 2017196249 | | 11/2017 | |
| WO | WO-2019064204 A1 | * | 4/2019 | ......... G06F 9/45558 |
| WO | WO-2020107428 A1 | * | 6/2020 | |

OTHER PUBLICATIONS

B. Raghothaman, E. Deng, R. Pragada, G. Sternberg, T. Deng and K. Vanganuru, "Architecture and protocols for LTE-based device to device communication," 2013 International Conference on Computing, Networking and Communications (ICNC), 2013, pp. 895-899, doi: 10.1109/ICCNC.2013.6504208. (Year: 2013).*

Huawei et al., "Introduction of eV2X in TS 36.300," 3GPP TSG-RAN WG2 Meeting #102, R2-1809265, May 2018, 14 pages.

EPO, Extended European Search Report for EP Application No. 19838891.0, dated Jul. 26, 2021.

WIPO, ISR and WO for PCT/CN2019/096761, Oct. 24, 2019.

EPO, Communication for EP Application No. 19838891.0, dated Mar. 7, 2022.

* cited by examiner

D2D COMMUNICATION METHOD AND TERMINAL DEVICE

The present application is a continuation of International Application No. PCT/CN2019/096761, filed Jul. 19, 2019, which claims the priority to Chinese Patent Application No. 201810798883.3, filed Jul. 19, 2018, the entire disclosures of which are incorporated herein by reference.

BACKGROUND

Technical Field

The embodiments of the present application relate to the field of communications technologies, and in particular, to a method and a terminal device for device-to-device (D2D) communication.

The Internet of vehicles (IoV), also referred to as vehicle to everything (V2X) communication system, adopts sidelink (SL) transmission technology based on D2D communication. Different from the traditional manner in which data is received or sent through a base station, the terminal-to-terminal direct communication is adopted in the IoV system, so it has higher spectrum efficiency and lower transmission delay. For the coexistence of D2D communication in the long term evolution (LTE) network and the new radio (NR) network (also referred to as 5G network), it is necessary to solve the problem of how to aggregate the protocol stacks in the LTE standard and the NR standard.

SUMMARY

Embodiments of the present application provide a method and a terminal device for D2D communication, where the terminal device can perform D2D communication in the LTE standard and NR standard at the same time.

According to a first aspect, there is provided a D2D communication method, including: performing, by a terminal device using a same packet data convergence protocol (PDCP) entity, D2D communication in a LTE) standard and a NR standard.

According to a second aspect, there is provided a terminal device configured to perform the method according to the first aspect or any possible implementation manner thereof. Specifically, the terminal device includes a unit configured to perform the method according to the first aspect or any possible implementation manner thereof.

According to a third aspect, there is provided a terminal device including: a processor and a memory, wherein the memory is configured to store a computer program, and the processor is configured to call and run the computer program stored in the memory, thereby performing the method according to the first aspect or any possible implementation manner thereof.

According to a fourth aspect, there is provided a chip configured to perform the method according to the first aspect or any possible implementation manner thereof. Specifically, the chip includes: a processor, configured to call and run a computer program from a memory, causing a device installed with the chip to perform the method according to the first aspect or any possible implementation manner thereof.

According to a fifth aspect, there is provided a computer-readable storage medium, being used for storing a computer program that causes a computer to perform the method according to the first aspect or any possible implementation manner thereof.

According to a sixth aspect, there is provided a computer program product, including computer program instructions that cause a computer to perform the method according to the first aspect or any possible implementation manner thereof.

According to a seventh aspect, there is provided a computer program, when being executed on a computer, causing the computer to perform the method according to the first aspect or any possible implementation manner thereof.

Based on the above technical solution, when performing D2D communication, the terminal device can perform the D2D communication in the LTE standard and NR standard at the same time by using the same PDCP entity to perform the D2D communication in the LTE standard and NR standard.

DETAILED DESCRIPTION

The technical solutions in the embodiments of the present application will be described below with reference to the drawings.

It should be understood that the technical solutions of the embodiments of the present application can be applied to various communication systems, for example, Global System of Mobile Communication (GSM) system, Code Division Multiple Access (CDMA) system, Wideband Code Division Multiple Access (WCDMA) system, Long Term Evolution (LTE) system, LTE Frequency Division Duplex (FDD) system, LTE Time Division Duplex (TDD), Universal Mobile Telecommunication System (UMTS), future 5G communication system, and the like.

Various embodiments are described with reference to a terminal device in the present application. The terminal device may be also referred to as User Equipment (UE), access terminal, user unit, user station, mobile station, mobile site, remote station, remote terminal, mobile equipment, user terminal, terminal, wireless communication equipment, user agent or user device. The access terminal may be a cellular phone, a cordless phone, a Session Initiation Protocol (SIP) phone, a wireless local loop (WLL) station, a personal digital assistant (PDA), handheld devices and computing devices with wireless communication function, or other processing devices, in-vehicle devices and wearable devices connected to wireless modems, terminal devices in the future 5G network or future evolved Public Land Mobile Network (PLMN) network.

Various embodiments are described with reference to a network device in the present application. The network device may be a device communicating with terminal devices, for example, it may be a Base Transceiver Station (BTS) in the GSM or CDMA system, or a NodeB (NB) in the WCDMA system, or an Evolutional Node B (eNB or eNodeB) in the LTE system. Alternatively, the network device may be a relay station, an access point, in-vehicle equipment, wearable equipment, and network side equipment in the future 5G network or the future evolved PLMN network.

Figure 1:
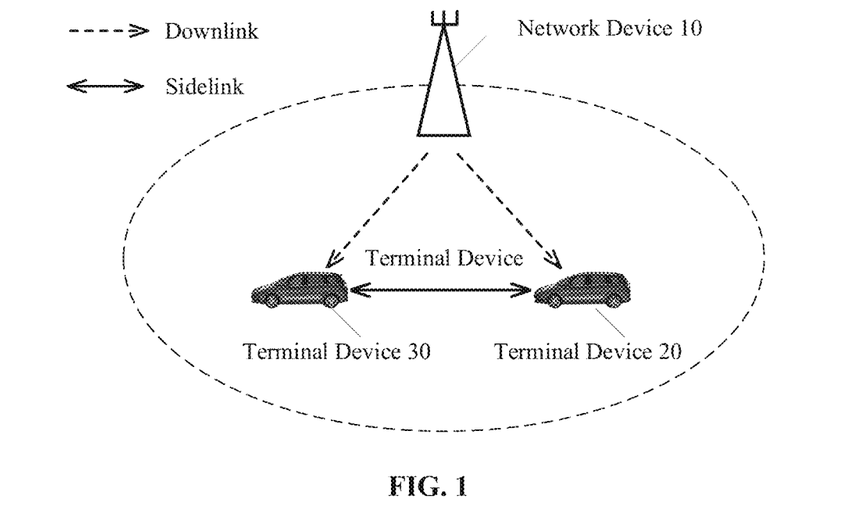
FIG. 1 is a schematic architecture diagram illustrating an application scenario according to an embodiment of the present application.
Figure 2:
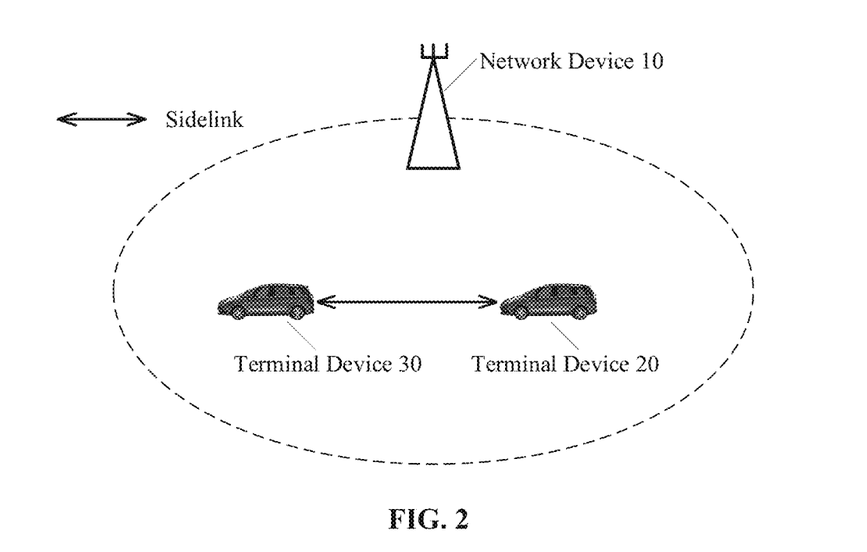
FIG. 2 is a schematic architecture diagram illustrating another application scenario according to an embodiment of the present application.

FIG. 1 and FIG. 2 are schematic diagrams illustrating application scenarios according to an embodiment of the present application. FIG. 1 exemplarily shows one network device and two terminal devices. Optionally, the wireless communication system may include multiple network devices and the coverage of each network device may include other numbers of terminal devices, which is not limited in the embodiments of the application. In addition, the wireless communication system may also include other network entities, such as a mobile management entity (MME), a serving gateway (S-GW), a packet data network gateway (P-GW), and the like. Embodiments of the present application are not limited thereto.

Specifically, a first terminal device and a second terminal device may communicate in a D2D communication mode. When performing D2D communication, the first terminal device and the second terminal device directly communicate with each other through a D2D link, that is, a sidelink (SL). For example, as shown in FIG. 1 or FIG. 2, the first terminal device and the second terminal device directly communicate with each other through the SL. In FIG. 1, the first terminal device and the second terminal device communicate with each other through SL, with the transmission resource being allocated by the network device. In FIG. 2, the first terminal device and the second terminal device communicate with each other through SL, with the transmission resource being autonomously selected by the terminal device without being allocated by the network device.

D2D communication may refer to vehicle to vehicle (V2V) communication or vehicle to everything (V2X) communication. In V2X communication, X may generally refer to any device with wireless receiving and sending capabilities, including but not limited to slow-moving wireless devices, fast-moving vehicle-mounted devices, or network control nodes with wireless transmitting and receiving capabilities. It should be understood that the embodiments of the present disclosure are generally applied to the scenario of V2X communication, but can also be applied to any other D2D communication scenario, which is not limited in the embodiments of the present application.

Two transmission modes are defined in the IoV, namely transmission mode 3 (mode 3) and transmission mode 4 (mode 4). The transmission resources of the terminal device in transmission mode 3 (referred to as mode 3) are allocated by the base station, and the terminal device transmits data on the SL according to the resources allocated by the base station. The base station may allocate resources for a single transmission to the terminal device, and may allocate semi-static transmission resources to the terminal device. The terminal device in transmission mode 4 (referred to as mode 4), if having a sensing capability, may use sensing and reservation for data transmission. If it does not have the sensing capability, the terminal device may randomly select resources from a resource pool for transmission. The terminal device with sensing capability obtains a set of available resources from the resource pool by means of sensing, and randomly selects a resource from the set for data transmission. Since the services in the IoV system have periodic characteristics, the terminal device generally adopts semi-static transmission, that is, after the terminal device selects a transmission resource, it may continue to use the resource in multiple transmission periods, thereby reducing the probability of resource reselection and resource conflicts. The terminal device will carry the information on a reserved resource for the next transmission in the control information of the current transmission, so that other terminal devices can determine whether the resource is reserved and used by the terminal device by detecting the control information of the terminal device, thereby reducing resource conflicts.

The V2X communication is optimized in protocol Release 15 (Rel-15) by adding functions such as carrier aggregation, 64 quadrature amplitude modulation (QAM), and transmit diversity. In view of this, Rel-16/Rel-17 will further optimize V2X communication based on 5G NR. Therefore, it is necessary to solve the problem of how to aggregate the protocol stacks of the LTE network and the NR network, thereby achieving the D2D communication in the LTE network and the NR network at the same time.

Therefore, the embodiments of this application propose that the terminal device uses the same packet data convergence protocol (PDCP) entity to perform D2D communication in the LTE standard and the NR standard, thereby solving the problem of how to aggregate the protocol stacks of the LTE network and the NR network.

Figure 3:
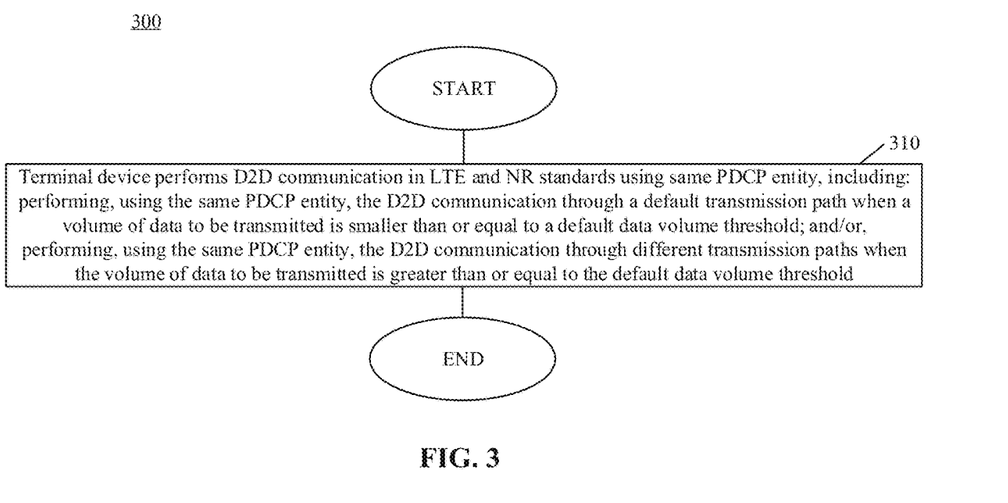
FIG. 3 is a schematic flow chart illustrating a method for D2D communication according to an embodiment of the present application.

FIG. 3 is a schematic flowchart illustrating a D2D communication method according to an embodiment of the present application. The method described in FIG. 3 may be performed by a terminal device, and the terminal device may be, for example, the terminal device 20 or the terminal device 30 shown in FIG. 1 or FIG. 2. As shown in FIG. 3, the D2D communication method 300 may include following steps.

In 310, the terminal device uses the same PDCP entity to perform D2D communication in the LTE standard and the NR standard.

When the terminal device can support D2D communication in both the LTE and NR standards at the same time, typically the terminal device can only select one of the LTE and NR standards for D2D communication and, thus, cannot flexibly perform D2D communication under the two standards together. If the terminal device performs D2D communication under only one standard, the diversity gain cannot be obtained.

Therefore, in an embodiment of the present application, the terminal device uses the same PDCP entity to perform D2D communication under the LTE standard and the NR standard. Since the terminal device can use the same PDCP entity to perform D2D communication under the LTE standard and perform D2D communication under the NR standard, the data transmission is more flexible and the diversity gain can be obtained. For example, when the current data volume of the path under the NR standard is large, the terminal device may perform D2D data transmission more frequently on the path under the LTE standard; when the current data volume of the path under the LTE standard is large, the terminal device may perform D2D data transmission more frequently on the path under the NR standard.

In an embodiment of the present application, the LTE standard may include the protocol Rel-14 or Rel-15. In other words, when the terminal device performs D2D communication based on the LTE standard, the protocol version used is Rel-14 or Rel-15. The NR standard may include the protocol Rel-16, or also include subsequent protocol versions such as Rel-17.

It should be understood that in the embodiments of the present application, the LTE standard may also be understood as the LTE network or the LTE system. For example, transmission under the LTE standard may be transmission based on the LTE network protocol, and each entity under the LTE standard may include various entities implemented based on LTE network protocol. The NR standard may also be understood as the NR network or the NR system. For example, the transmission under the NR standard may be transmission based on the NR network protocol, and each entity under the NR standard may include various entities implemented based on the NR network protocol.

Optionally, the PDCP entity corresponds to two radio link control (RLC) entities, and the two RLC entities are respectively an RLC entity in the LTE standard and an RLC entity in the NR standard.

Figure 4A:
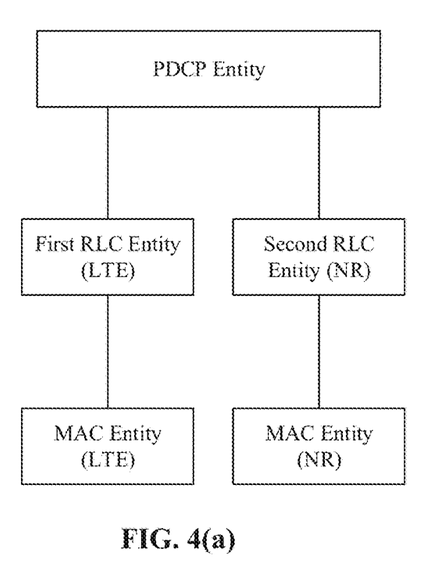
FIG. 4(a) and FIG. 4(b) are schematic architecture diagrams illustrating the PDCP entity, RLC entity and MAC entity according to an embodiment of the present application.
Figure 4B:
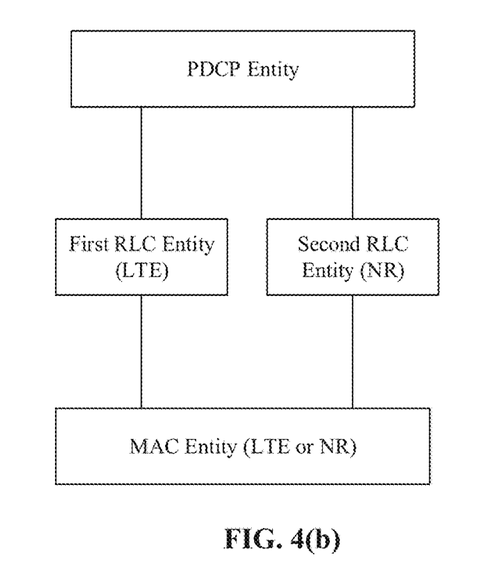

For example, as shown in FIG. 4(a) and FIG. 4(b), the terminal device shares a PDCP entity when performing D2D communication, that is, using SL for communication, and the PDCP entity corresponds to the first RLC entity and the second RLC entity. In an embodiment, the first RLC entity is an RLC entity in the LTE standard, and the second RLC entity is an RLC entity in the NR standard. For example, when the terminal device performs current data transmission, data packet 1 and data packet 3 may be transmitted through the first RLC entity, and data packet 2 and data packet 4 may be transmitted through the second RLC entity.

Optionally, the two RLC entities respectively use two sets of logical channel identifiers (LCIDs), and LCID values in the two different sets of LCIDs are in one-to-one correspondence.

For example, the aforementioned LCID value of the data packet 1 transmitted through the first RLC entity may correspond to the LCID value of the data packet 2 transmitted through the second RLC entity. After other terminal devices receive data packet 1 and data packet 2 sent by the terminal device, once it is determined that the LCID values of data packet 1 and data packet 2 correspond to each other, data packet 1 and data packet 2 may be integrated processed.

In an embodiment, the corresponding LCID values in the two sets of LCIDs may be the same or different.

For example, the first RLC entity uses the first set of LCIDs, including LCID #1 to LCID #50; the second RLC entity uses the second set of LCIDs, including LCID #1 to LCID #50. Moreover, the correspondence between the first set of LCIDs and the second set of LCIDs may be as shown in Table 1. In this way, optionally, the different formats of data units carrying LCIDs in the LTE standard and the NR standard can be used for distinguishing the LCID corresponding to which RLC entity.

Alternatively, the first RLC entity uses the first set of LCIDs, for example, including LCID #1 to LCID #50; the second RLC entity uses the second set of LCIDs, for example, including LCID #51 to LCID #100. Moreover, the correspondence between the first set of LCIDs and the second set of LCIDs may be as shown in Table 2.

TABLE 1

| First Set of LCIDs (First RLC Entity) | Second Set of LCIDs (Second RLC Entity) |
|---|---|
| LCID#1 | LCID#1 |
| LCID#2 | LCID#2 |
| ... | ... |
| LCID#49 | LCID#49 |
| LCID#50 | LCID#50 |

TABLE 2

| First Set of LCIDs (First RLC Entity) | Second Set of LCIDs (Second RLC Entity) |
|---|---|
| LCID#1 | LCID#51 |
| LCID#2 | LCID#52 |
| ... | ... |
| LCID#49 | LCID#99 |
| LCID#50 | LCID#100 |

Optionally, indication information may be carried in a multiple access control (MAC) header or a MAC subheader, and used for indicating whether the two RLC entities use the same PDCP entity.

Taking the first RLC entity and the second RLC entity in FIG. 4(a) and FIG. 4(b) as an example, the first RLC entity and the second RLC entity may correspond to the same PDCP entity. However, when the terminal device performs data transmission through the two RLC entities, the two RLC entities may use the same PDCP entity or different PDCP entities. Whether the two RLC entities actually use the same PDCP entity can be indicated by the indication information (e.g., 1-bit indication information) in the MAC header or MAC subheader.

For example, when the indication information is 1, it indicates that the two RLC entities use the same PDCP entity; when the indication information is 0, it indicates that the two RLC entities use different PDCP entities. In this way, other terminal devices can know whether the data on the two RLC entities received from the terminal device comes from the same PDCP entity or different PDCP entities.

In addition, optionally, the LCID used by each RLC entity when the two RLC entities use the same PDCP entity is different from the LCID used by each RLC entity when the two RLC entities use different PDCP entities.

Taking the first RLC entity in FIG. 4(a) and FIG. 4(b) as an example, when the first RLC entity does not share the same PDCP entity with the second RLC entity, a range of LCIDs used by the first RLC entity is assumed to be LCID $\#N_1$ to LCID $\#N_2$; when the first RLC entity and the second RLC entity share the same PDCP entity, a range of LCIDs used by the first RLC entity is assumed to be LCID $\#M_1$ to LCID $\#M_2$. In an embodiment, the range of LCID $\#N_1$ to LCID $\#N_2$ and the range of LCID $\#M_1$ to LCID $\#M_2$ do not overlap. For example, $N_1<N_2<M_1<M_2$, or $M_1<M_2<N_1<N_2$.

In an embodiment, the indication information may also be carried in other parts, for example, carried in an RLC header or an RLC subheader.

Optionally, for example, as shown in FIG. 4(a), the RLC entity in the LTE standard corresponds to the MAC entity in the LTE standard, and the RLC entity in the NR standard corresponds to the MAC entity in the NR standard.

Or, optionally, as shown in FIG. 4(b), the two RLC entities correspond to the same MAC entity. The same MAC entity is a MAC entity in the LTE standard or a MAC entity in the NR standard.

When the two RLC entities correspond to the same MAC entity, for example, content of a corresponding field may be added or changed in a header of a service data unit (SDU) or protocol data unit (PDU) in the MAC layer, so as to distinguish the RLC entity through which the corresponding D2D data is transmitted. Alternatively, it is also possible to distinguish the specific RLC entity as used by adding or changing content of a corresponding field of a data packet header in the RLC layer. Embodiments of the present application are not limited thereto.

Optionally, in 310, the terminal device may perform the D2D communication according to first information as received or pre-configured. In an embodiment, the first information is used for indicating whether the terminal device can perform D2D communication in the LTE standard and the NR standard.

It may be understood that the first information is used for indicating whether the terminal device can use the same PDCP to perform D2D communication in the LTE standard and the NR standard.

In other words, the terminal device may only support the use of PDCP entities in the NR standard for D2D communication in the NR standard; or, only support the use of PDCP entities in the LTE standard for D2D communication in the LTE standard; or, as in the forgoing embodiments of the present application, the terminal device may also simultaneously support the use of the same PDCP entity for D2D communication in the LTE standard and the NR standard. Whether the terminal device can simultaneously support D2D communication in the LTE standard and the NR standard may be indicated by the first information. The first information may be an instruction from an upper layer (e.g., it may be sent to the terminal device by the network device, sent to the terminal device by an application layer, or sent to the terminal device by other devices), or may be pre-configured in the terminal device, for example, as defined in the protocol.

Optionally, in 310, the terminal device may perform the D2D communication according to second information as received or pre-configured. In an embodiment, the second information is used for indicating whether the terminal device performs duplicated data transmission for the data to be transmitted.

For example, the second information may be sent by the network device to the terminal device, or sent by the application layer to the terminal device, or sent by other devices to the terminal device, or pre-configured in the terminal device, for example, as defined in the protocol, which is not limited herein.

Further, optionally, the second information is also used for indicating whether the terminal device can transmit the data to be transmitted in the LTE standard and the NR standard by means of duplicated data transmission.

The transmission of the data to be transmitted in the LTE standard and the NR standard by means of duplicated data transmission described here means that non-duplicated data and duplicated data are transmitted under the two standards, respectively. In other words, after data duplication, the terminal device performs transmission of the non-duplicated data and the duplicated data in the LTE standard and the NR standard, respectively. Alternatively, after data duplication, the terminal device performs transmission of the non-duplicated data and the duplicated data in the NR standard and the LTE standard, respectively. It does not mean that the terminal device performs data duplication once under the LTE standard and performs data duplication once under the NR standard.

For example, if the second information indicates that the terminal device can perform data transmission in the LTE standard and the NR standard by means of duplicated data transmission, then the terminal device, after data duplication, can perform transmission of the non-duplicated data and the duplicated data in the LTE standard and the NR standard, respectively, or perform transmission of the duplicated data and the non-duplicated data in the LTE standard and the NR standard, respectively. If the second information indicates that the terminal device only supports the duplicated data transmission under the LTE standard, then the terminal device can only perform duplicated data transmission under the LTE standard, that is, perform transmission of the non-duplicated data and the duplicated data under the LTE standard. If the second information indicates that the terminal device only supports the duplicated data transmission under the NR standard, then the terminal device can only perform duplicated data transmission under the NR standard, that is, perform transmission of the non-duplicated data and the duplicated data under the NR standard.

The specific process for the terminal device to perform duplicated data transmission for D2D data may refer to, for example, the duplicated data transmission process for cellular data in cellular communication, which will not be repeated here.

Optionally, in 310, the terminal device may perform the D2D communication according to third information as received or pre-configured. In an embodiment, the third information is used for indicating a default transmission path and/or a default data volume threshold.

The default transmission path is, for example, a transmission path in the LTE standard or a transmission path in the NR standard. It may be understood that the transmission path in the LTE standard is a transmission path through the RLC entity under the LTE standard, and the transmission path in the NR standard is a transmission path through the RLC entity under the NR standard.

Optionally, when a volume of data to be transmitted is smaller than or equal to the default data volume threshold, the terminal device uses the same PDCP entity to perform D2D communication on the default transmission path; and/or, when the volume of data to be transmitted is greater than or equal to the default data volume threshold, the terminal device uses the same PDCP entity to perform D2D communication in different transmission paths. For example, it is possible to select part or all of the paths in different transmission paths for performing data transmission.

The default data volume threshold is, for example, 0, or infinity, or may be other values.

For example, the third information may be sent by the network device to the terminal device, or sent by the application layer to the terminal device, or sent by other devices to the terminal device, or pre-configured in the terminal device, for example, as defined in the protocol, which is not limited herein.

Optionally, when the terminal device performs D2D communication with other terminal devices, at least one of the foregoing information may need to be configured for the data to be transmitted. For example, for different data to be transmitted, different first information and/or second information and/or third information may be configured.

Optionally, when the terminal device performs D2D communication with other terminal devices, at least one of the foregoing information may be configured with respect to the provider service identifier (PSID) and/or the intelligent transportation system application identifier (ITS-AID).

In an embodiment, optionally, the first information configured for the same PSID or ITS-AID is the same; and/or, the second information configured for the same PSID or ITS-AID is the same; and/or, the third information configured for the same PSID or ITS-AID is the same.

In other words, the same first information may be configured for the same PSID or ITS-AID; and/or the same second information may be configured for the same PSID or ITS-AID; and/or the same third information may be configured for the same PSID or ITS-AID.

In other words, the first information configured for different PSIDs or ITS-AIDs are different or the same; and/or the second information configured for different PSIDs or ITS-AIDs are different or the same; and/or, the third information configured for different PSIDs or ITS-AIDs are different or the same.

For example, as shown in Table 3, taking the first information as an example, the first information indicates whether D2D communication can be performed in the LTE standard and the NR standard, and the first information corresponding to different PSID #0 may be different or the same. As shown in Table 3, the second information corresponding to PSID #0, PSID #1, and PSID #2 indicates that D2D communication can be performed in LTE and NR standards, and the second information corresponding to PSID #3 and PSID #4 indicates that the D2D communication can be performed only under the LTE standard, and the second information corresponding to PSID #5 indicates that the D2D communication can be performed only under the NR standard.

TABLE 3

| PSID | First Information |
|---|---|
| PSID#0 | D2D communication can be performed in LTE and NR standards |
| PSID#1 | D2D communication can be performed in LTE and NR standards |
| PSID#2 | D2D communication can be performed in LTE and NR standards |
| PSID#3 | D2D communication can be performed only in LTE standard |
| PSID#4 | D2D communication can be performed only in LTE standard |
| PSID#5 | D2D communication can be performed only in NR standard |
| ... | ... |

For another example, as shown in Table 4, taking the second information as an example, the second information is used for indicating whether to perform duplicated data transmission for the data to be transmitted. The second information corresponding to different PSIDs may be different or the same. As shown in Table 4, the second information corresponding to PSID #0 and PSID #1 indicates that data can be transmitted in the LTE standard and the NR standard by means of duplicated data transmission, and the second information corresponding to PSID #2 and PSID #3 indicates the duplicated data transmission can be performed only under the NR standard, and the second information corresponding to PSID #4 and PSID #5 indicates that the duplicated data transmission can be performed only under the LTE standard.

TABLE 4

| PSID | Second Information |
|---|---|
| PSID#0 | Duplicated data transmission is supported in the LTE standard and the NR standard |
| PSID#1 | Duplicated data transmission is supported in the LTE standard and the NR standard |
| PSID#2 | Duplicated data transmission is supported only in the NR standard |
| PSID#3 | Duplicated data transmission is supported only in the NR standard |
| PSID#4 | Duplicated data transmission is supported only in the LTE standard |
| PSID#5 | Duplicated data transmission is supported only in the LTE standard |
| ... | ... |

For another example, as shown in Table 5, taking the third information as an example, the third information is used for indicating the default transmission path and the default data volume threshold. In an embodiment, different ITS-AIDs correspond to different third information. As shown in Table 5, the default transmission path corresponding to ITS-AID #0 to ITS-AID #2 is the transmission path in the LTE standard and the default data volume threshold is 0; and the transmission path corresponding to ITS-AID #3 to ITS-AID #5 is the transmission path in the NR standard and the default data volume threshold is infinity.

TABLE 5

| | Third Information | |
|---|---|---|
| ITS-AID | Default Transmission Path | Default Data Volume Threshold |
| ITS-AID#0 | Transmission Path in LTE Standard | 0 |
| ITS-AID#1 | Transmission Path in LTE Standard | 0 |
| ITS-AID#2 | Transmission Path in LTE Standard | 0 |
| ITS-AID#3 | Transmission Path in NR Standard | Infinity |
| ITS-AID#4 | Transmission Path in NR Standard | Infinity |
| ITS-AID#5 | Transmission Path in NR Standard | Infinity |
| ... | ... | |

In an embodiment, the first information, the second information, and the third information may all be configured with respect to the PSID and/or ITS-AID, or part of the first information, the second information, and the third information may be configured with respect to the PSID and/or ITS-AID. For example, Table 6 shows the first, second, and third information corresponding to different ITS-AIDs.

TABLE 6

| | | | Third Information | |
|---|---|---|---|---|
| PSID | First Information | Second Information | Default Transmission Path | Default Data Volume Threshold |
| PSID#0 | D2D communication can be performed in LTE and NR standards | Duplicated data transmission is supported in the LTE standard and the NR standard | Transmission Path in NR Standard | 0 |

TABLE 6-continued

| PSID | First Information | Second Information | Third Information | |
|------|-------------------|--------------------|---|---|
| | | | Default Transmission Path | Default Data Volume Threshold |
| PSID#1 | D2D communication can be performed in LTE and NR standards | Duplicated data transmission is supported in the LTE standard and the NR standard | Transmission Path in NR Standard | 0 |
| PSID#2 | D2D communication can be performed only in LTE standard | Duplicated data transmission is not performed | Transmission Path in LTE Standard | 0 |
| PSID#3 | D2D communication can be performed only in LTE standard | Duplicated data transmission is not performed | Transmission Path in NR Standard | Infinity |
| PSID#4 | D2D communication can be performed only in NR standard | Duplicated data transmission is supported only in the NR standard | Transmission Path in NR Standard | Infinity |
| PSID#5 | D2D communication can be performed only in NR standard | Duplicated data transmission is supported only in the NR standard | Transmission Path in NR Standard | Infinity |
| ... | ... | ... | ... | ... |

It should be noted that, under the premise of no conflict, the various embodiments described in this application and/or the technical features in each embodiment may be combined with each other arbitrarily, and the technical solutions obtained after the combination should also fall within the protection scope of this application.

It should be understood that, in the various embodiments of the present application, the sequence number of the above-mentioned processes does not mean the order of execution, and the execution order of each process should be determined by its function and internal logic, rather than constituting any limitation to the implementation process corresponding to the embodiments of the present application.

The communication method according to the embodiments of the present application is described in detail above, and the device according to the embodiments of the present application will be described below with reference to FIG. 5 to FIG. 7. The technical features described in the method embodiments are applicable to the following device embodiments.

Figure 5:
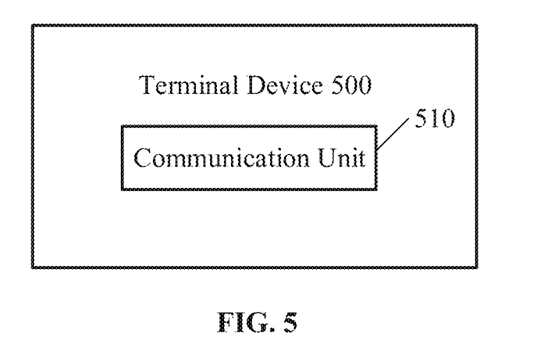
FIG. 5 is a block diagram illustrating a terminal device according to an embodiment of the present application.

FIG. 5 is a block diagram illustrating a terminal device 500 according to an embodiment of the present application. As shown in FIG. 5, the terminal device 500 includes: a communication unit 510, which is configured to perform, using a same PDCP entity, D2D communication in the LTE standard and the NR standard.

Therefore, by using the same PDCP entity, the terminal device can support D2D communication under both the LTE standard and the NR standard, so the data transmission is more flexible and the diversity gain can be obtained.

Optionally, the PDCP entity corresponds to two RLC entities, and the two RLC entities include an RLC entity in the LTE standard and an RLC entity in the NR standard.

Optionally, the two RLC entities adopt two sets of LCIDs, respectively, and LCID values in the two sets of LCIDs correspond to each other one to one.

Optionally, corresponding LCID values in the two sets of LCIDs are same or different.

Optionally, indication information is carried in a MAC header or a MAC subheader, and used for indicating whether the two RLC entities adopt the same PDCP entity.

Optionally, a LCID used by the RLC entity when the two RLC entities adopt the same PDCP entity is different from another LCID used by the RLC entity when the two RLC entities adopt different PDCP entities.

Optionally, indication information is carried in an RLC header or an RLC subheader, and used for indicating whether the two RLC entities adopt the same PDCP entity.

Optionally, an RLC entity in the LTE standard corresponds to a MAC entity in the LTE standard, and an RLC entity in the NR standard corresponds to a MAC entity in the NR standard.

Optionally, the two RLC entities correspond to a same MAC entity, and the same MAC entity is a MAC entity in the LTE standard or a MAC entity in the NR standard.

Optionally, the communication unit is specifically configured to: perform the D2D communication according to first information as received or pre-configured, the first information being used for indicating whether the terminal device can perform the D2D communication in the LTE standard and the NR standard.

Optionally, the communication unit is specifically configured to: perform the D2D communication according to second information as received or pre-configured, the second information being used for indicating whether the terminal device performs duplicated data transmission for data to be transmitted.

Optionally, the second information is further used for indicating whether the terminal device can transmit the data to be transmitted by means of duplicated data transmission in the LTE standard and the NR standard.

Optionally, the communication unit is specifically configured to: perform the D2D communication according to third information as received or pre-configured, the third information being used for indicating a default transmission path and/or a default data volume threshold.

Optionally, the default transmission path is a transmission path in the LTE standard or a transmission path in the NR standard.

Optionally, the communication unit is specifically configured to: perform, using the same PDCP entity, the D2D communication through the default transmission path when a volume of data to be transmitted is smaller than or equal to the default data volume threshold; and/or, perform, using the same PDCP entity, the D2D communication through different transmission paths when the volume of data to be transmitted is greater than or equal to the default data volume threshold.

Optionally, the default data volume threshold is 0 or infinity.

Optionally, first information configured for a same provider service identifier (PSID) or intelligent transportation system application identifier (ITS-AID) is same; and/or, second information configured for the same PSID or ITS-AID is same; and/or, third information configured for the same PSID or ITS-AID is same.

Optionally, the LTE standard includes a protocol Rel-14 or Rel-15.

It should be understood that the terminal device 500 may be configured to perform corresponding operations performed by the terminal device in the forgoing method 300, which is not repeated here for brevity.

Figure 6:
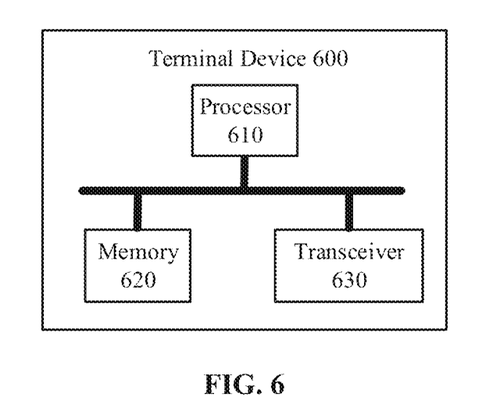
FIG. 6 is a schematic diagram illustrating a terminal device according to an embodiment of the present application.

FIG. 6 is a schematic structural diagram of a terminal device 600 provided by an embodiment of the present application. The terminal device 600 shown in FIG. 6 includes a processor 610, and the processor 610 can call and run a computer program from a memory to implement the corresponding flow process performed by the terminal device in the method according to various embodiments of the present application. Description thereof is not repeated here for brevity.

Optionally, as shown in FIG. 6, the terminal device 600 may further include a memory 620. The processor 610 may call and run a computer program from the memory 620 to implement the method in the embodiment of the present application.

The memory 620 may be a separate device independent of the processor 610, or may be integrated in the processor 610.

Optionally, as shown in FIG. 6, the terminal device 600 may further include a transceiver 630, and the processor 610 may control the transceiver 630 to communicate with other devices. Specifically, it may send information or data to other devices, or receive information or data sent by the other devices.

The transceiver 630 may include a transmitter and a receiver. The transceiver 630 may further include an antenna, and the number of antennas may be one or more.

Figure 7:
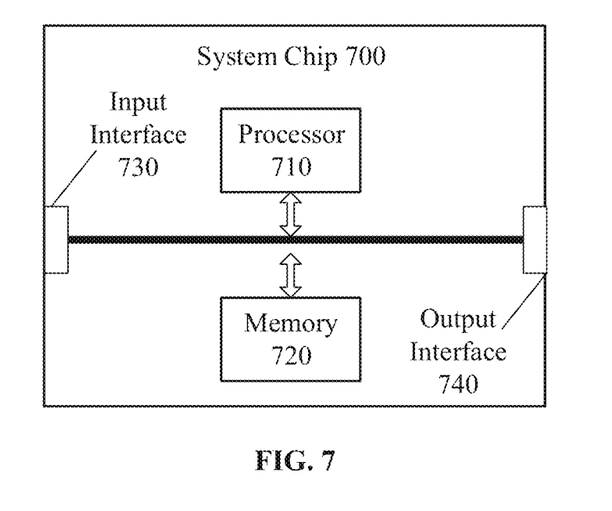
FIG. 7 is a block diagram illustrating a chip according to an embodiment of the present application.

FIG. 7 is a block diagram illustrating a chip according to an embodiment of the present application. The chip 700 shown in FIG. 7 includes a processor 710, and the processor 710 can call and run a computer program from the memory to implement the method according to the embodiments of the present application.

Optionally, as shown in FIG. 5, the chip 700 may further include a memory 720. In an embodiment, the processor 710 may call and run a computer program from the memory 720 to implement the corresponding flow process performed by the terminal device in the method according to various embodiments of the present application. Description thereof is not repeated here for brevity.

Optionally, as shown in FIG. 7, the chip 700 may further include a memory 720. The processor 710 may call and run a computer program from the memory 720 to implement the method in the embodiment of the present application.

In an embodiment, the memory 720 may be a separate device independent of the processor 710, or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 can control the output interface 740 to communicate with other devices or chips, and specifically, can output information or data to other devices or chips.

It should be understood that the chip mentioned in the embodiment of the present application may also be referred to as a system-level chip, a system chip, a chip system, a system-on-chip, or the like.

It should be understood that the processor according to the embodiments of the present application may be an integrated circuit chip with signal processing capability. In the implementation process, the steps of the foregoing method embodiments can be completed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programming logic devices, discrete gates or transistor logic devices, discrete hardware components. The methods, steps, and logical block diagrams disclosed in the embodiments of the present application can be implemented or executed thereby. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module can be located in a mature storage medium such as random access memory, flash memory, read-only memory, programmable read-only memory, or electrically erasable programmable memory, registers. The storage medium may be located in the memory, and the processor reads the information in the memory and completes the steps of the above method in combination with its hardware.

It can be understood that the memory in the embodiment of the present application may be a volatile memory or a non-volatile memory, or may include both volatile and non-volatile memory. In an embodiment, the non-volatile memory may be read-only memory (ROM), programmable ROM (PROM), erasable PROM (EPROM), and electrically EPROM (EEPROM) or flash memory. The volatile memory may be a random access memory (RAM), which is used as an external cache. By way of exemplary description without limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct Rambus RAM (DR RAM). It should be noted that the memories of the systems and methods described herein are intended to include, but are not limited to, these and any other suitable types of memories.

It should be understood that the foregoing memory is exemplary but not restrictive. For example, the memory in the embodiment of the present application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM) direct Rambus RAM (DR RAM), and the like. That is to say, the memory in the embodiments of the present application is intended to include but not limited to these and any other suitable types of memory.

The embodiment of the present application also provides a computer-readable storage medium for storing a computer program. The computer-readable storage medium can be applied to the terminal device in the embodiments of the present application, and the computer program enables the computer to execute the corresponding process implemented by the terminal device in the method according to each embodiment of the present application, which will not be repeated for brevity.

The embodiments of the present application also provide a computer program product, including computer program instructions. The computer program product can be applied to the terminal device in the embodiments of the present application, and the computer program instructions cause the computer to execute the corresponding process implemented by the terminal device in the method according to each embodiment of the present application, which will not be repeated for brevity.

The embodiment of the present application also provides a computer program. The computer program can be applied to the terminal device in the embodiments of the present application. When the computer program runs on the computer, the computer is caused to execute the corresponding process implemented by the terminal device in the method according to each embodiment of the present application, which will not be repeated for brevity.

It should be understood that the terms "system" and "network" in this article may be used interchangeably in this disclosure. The term "and/or" in this disclosure indicates only an association relationship describing associated objects, which means that there may be three relationships, for example, A and/or B may refer to three following cases: only A exists alone, A and B exist at the same time, or only B exists. In addition, the character "/" in this disclosure generally indicates that the associated objects before and after the character are in an "or" relationship.

It should also be understood that, in the embodiments of the present application, "B corresponding (related) to A" means that B is associated with A, and B may be determined according to A. However, it should also be understood that determining B according to A does not mean that B is determined only according to A, and B may also be determined according to A and/or other information.

It may be understood by those skilled in the art that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Those skilled in the art can use different methods for each specific application to implement the described functions, but such implementation should not be considered beyond the scope of this application.

Those skilled in the art can clearly understand that, for the convenience and conciseness of description, the specific working process of the above-described system, device, and unit can refer to the corresponding process in the foregoing method embodiments, which will not be repeated here.

In the several embodiments provided in this application, it should be understood that the disclosed system, device, and method may be implemented in other ways. For example, the device embodiments described above are only illustrative. For example, the division of the units is only a logical function division, and there may be other divisions in actual implementation, for example, multiple units or components can be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or they may be distributed on multiple network units. Some or all of the units may be selected according to actual needs to achieve the objectives of the solutions of the embodiments.

In addition, the functional units in each embodiment of the present application may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of this application essentially or the part that contributes to the existing technology or the part of the technical solution can be embodied in the form of a software product, and the computer software product may be stored in a storage medium, including several instructions causing a computer device (which may be a personal computer, a server, or a network device, etc.) to execute all or part of the steps of the methods described in the various embodiments of the present application. The aforementioned storage media include U disk, mobile hard disk, read-only memory (ROM), random access memory (RAM), magnetic disks or optical disks and other media that can store program codes.

The above are only specific implementations of this application, but the protection scope of this application is not limited to this. Any person skilled in the art can easily think of changes or substitutions within the technical scope disclosed in this application. Should be covered within the scope of protection of this application. Therefore, the protection scope of this application shall be subject to the protection scope of the claims.

What is claimed is:

1. A device-to-device (D2D) communication method, comprising:
    performing, by a terminal device using a same packet data convergence protocol (PDCP) entity, D2D communication in a long term evolution (LTE) standard and a new radio (NR) standard;
    wherein performing, by the terminal device using the same PDCP entity, D2D communication in the LTE standard and the NR standard comprises:
        performing, by the terminal device using the same PDCP entity, the D2D communication through a default transmission path when a volume of data to be transmitted is smaller than or equal to a default data volume threshold; and/or,
        performing, by the terminal device using the same PDCP entity, the D2D communication through different transmission paths when the volume of data to be transmitted is greater than or equal to the default data volume threshold.

2. The method according to claim 1, wherein the PDCP entity corresponds to two radio link control (RLC) entities, and the two RLC entities comprise an RLC entity in the LTE standard and an RLC entity in the NR standard.

3. The method according to claim 2, wherein indication information is carried in a multiple access control (MAC) header or a MAC subheader.

4. The method according to claim 2, wherein indication information is carried in an RLC header or an RLC sub-header.

5. The method according to claim 2, wherein an RLC entity in the LTE standard corresponds to a MAC entity in the LTE standard, and an RLC entity in the NR standard corresponds to a MAC entity in the NR standard.

6. The method according to claim 2, wherein the two RLC entities correspond to a same MAC entity, and the same MAC entity is a MAC entity in the LTE standard or a MAC entity in the NR standard.

7. The method according to claim 1, wherein the default transmission path is a transmission path in the LTE standard or a transmission path in the NR standard.

8. The method according to claim 1, wherein the default data volume threshold is 0 or infinity.

9. The method according to claim 1, wherein:
first information configured for a same provider service identifier (PSID) or intelligent transportation system application identifier (ITS-AID) is same; and/or,
second information configured for the same PSID or ITS-AID is same; and/or,
third information configured for the same PSID or ITS-AID is same.

10. A terminal device, comprising a transceiver, a processor and a memory, wherein the memory is configured to store a computer program, and the processor is configured to call and run the computer program stored in the memory to control the transceiver to:
perform, using a same packet data convergence protocol (PDCP) entity, device-to-device (D2D) communication in a long term evolution (LTE) standard and a new radio (NR) standard;
wherein the transceiver is further controlled to:
perform, using the same PDCP entity, the D2D communication through a default transmission path when a volume of data to be transmitted is smaller than or equal to a default data volume threshold; and/or,
perform, using the same PDCP entity, the D2D communication through different transmission paths when the volume of data to be transmitted is greater than or equal to the default data volume threshold.

11. The terminal device according to claim 10, wherein the PDCP entity corresponds to two radio link control (RLC) entities, and the two RLC entities comprise an RLC entity in the LTE standard and an RLC entity in the NR standard.

12. A non-transitory computer-readable storage medium storing a computer program that causes a computer to:
perform, using a same packet data convergence protocol (PDCP) entity, D2D communication in a long term evolution (LTE) standard and a new radio (NR) standard;
wherein the computer program further causes the computer to:
perform, using the same PDCP entity, the D2D communication through a default transmission path when a volume of data to be transmitted is smaller than or equal to a default data volume threshold; and/or,
perform, using the same PDCP entity, the D2D communication through different transmission paths when the volume of data to be transmitted is greater than or equal to the default data volume threshold.

* * * * *